（12） United States Patent
Nishihara et al.

(10) Patent No.: US 6,637,108 B2
(45) Date of Patent: Oct. 28, 2003

(54) METHOD FOR MANUFACTURING CYLINDER BLOCK FOR INTERNAL COMBUSTION ENGINE

(75) Inventors: Tatsuo Nishihara, Hamamatsu (JP); Ryo Yamauchi, Hamamatsu (JP)

(73) Assignee: Suzuki Motor Corporation, Shizuoka-ken (JP)

(*) Notice: Subject to any disclaimer, the term of this patent is extended or adjusted under 35 U.S.C. 154(b) by 76 days.

(21) Appl. No.: 10/033,683

(22) Filed: Dec. 27, 2001

(65) Prior Publication Data

US 2002/0162219 A1 Nov. 7, 2002

(30) Foreign Application Priority Data

Mar. 5, 2001 (JP) .......................................... 2001-059418

(51) Int. Cl.[7] ................................................. B23P 15/00
(52) U.S. Cl. .............................. 29/888.061; 29/888.06; 29/527.1; 29/527.2
(58) Field of Search ........................ 29/888.06, 888.061, 29/527.1, 527.2, 888.01; 123/193.2; 228/232, 119

(56) References Cited

U.S. PATENT DOCUMENTS 3,449,816 A * 6/1969 Swick et al.
4,918,805 A * 4/1990 Liszka et al. ............. 29/888.06
6,519,848 B2 * 2/2003 Komazaki et al. ...... 29/888.061

FOREIGN PATENT DOCUMENTS

JP 09314342 9/1997
JP 10246146 10/1998

* cited by examiner

Primary Examiner—I. Cuda Rosenbaum
(74) Attorney, Agent, or Firm—Darby & Darby

(57) ABSTRACT

A method for manufacturing a cylinder block provides an abrasion-resistant layer in a cylinder bore by build-up welding. The method applies build-up welding to preformed recesses along an inner surface of the cylinder bore. After build-up welding, final finishing provides a finished bore surface. The method creates an abrasion-resistant surface in areas prone to piston abrasion and manages welding strain to minimize cylinder block distortion.

17 Claims, 4 Drawing Sheets

METHOD FOR MANUFACTURING CYLINDER BLOCK FOR INTERNAL COMBUSTION ENGINE

BACKGROUND OF THE INVENTION

1. Field of the Invention

The present invention relates to a method for manufacturing a cylinder block for an internal combustion engine. More specifically, the present invention relates to a method of manufacturing a cylinder block with increased resistance to abrasive damage.

2. Description of the Related Art

There is a growing commercial demand for sleeveless cylinder blocks in internal combustion engines. Sleeveless cylinder blocks are preferably made from aluminum to reduce weight and improve engine cooling. Since aluminum sleeveless cylinder blocks are easily worn during use, a demand exists for cylinder blocks with an increased resistance to abrasion.

In response to the above demand, Japanese Unexamined Patent Publication No. 06-249057 has proposed a method for forming an abrasion-resistant layer on the inner surface of a cylinder by build-up welding. This Publication also describes a method for manufacturing an aluminum cylinder liner.

Unfortunately, the direct application of this build-up welding method to a cylinder block causes large welding strains due to the large thermal expansion coefficient of aluminum. The great welding strains caused by this method result in an unacceptable increase in the distortion in the cylinder block itself.

Large increases in cylinder block distortion make it nearly impossible to accurately position the cylinder block in a jig for post processing. This inability to accurately determine post processing distortion requires manufacturers to provide large finishing allowances thereby increasing costs. In some extreme cases, post processing causes the abrasion-resistant layers to crack or fail, making it impossible to use the cylinder block and further increasing costs.

The above-described method makes it practically impossible for designers to accurately predict the resulting strain distortion and the ultimate final shape further increasing costs, production times, and reducing quality. Other attempts to provide an abrasion resistant layer with high-composition aluminum alloy build-up welding have proven equally unsuccessful since the larger the composition of aluminum, the larger the resulting welding strain. In sum, the above-described method and others have not successfully met the commercial demand.

OBJECTS AND SUMMARY OF THE INVENTION

It is an object of the present invention to overcome the above-described liabilities.

It is another object of the present invention to provide a method where welding strain is effectively managed while forming an abrasion-resistant layer.

It another object of the present invention to provide a method for manufacturing a cylinder block where an abrasion resistant layer is formed by build-up welding, where build-up welding is overlaying and thickening of a material with a welding practice.

It is another object of the present invention to provide a method of manufacturing a cylinder block where build-up welding occurs on an inner bore surface of a cylinder in an area receiving abrasion during piston-action.

It is another object of the present invention to provide a method where build-up welding occurs in an area from at least about ±5° to about ±85°, along a thrust direction of a piston, and in an area from at least about ±5° to about ±85° in an anti-thrust direction of the piston.

It is another object of the present invention to provide a method easily adaptable to a inner surface of a preformed semi-elliptical or semi-oval-shaped engine block.

It is another object of the present invention to provide a method which allows increased predictive accuracy of post-processing distortion.

It is another object of the present invention to provide a method which has the foregoing features and capabilities.

The present invention relates to a method for manufacturing a cylinder block providing an abrasion-resistant layer in a cylinder bore by build-up welding. The method applies build-up welding to preformed recesses along an inner surface of the cylinder bore. After build-up welding, final finishing provides a finished bore surface. The method provides an abrasion-resistant surface in areas prone to piston abrasion and manages welding strain to effectively minimize cylinder block distortion.

According to an embodiment of the present invention, there is provided a method for manufacturing a cylinder block of an internal combustion engine, comprising the steps of: defining a set of parameters for the cylinder block including at least an abrasion resistance layer thickness, a desired welding strain, a first finished bore dimension, a thrust direction, and an anti-thrust direction, preforming a cylinder block matching the set of parameters, designating at least a first and a second build-up welding portion along a bore of the cylinder block corresponding to the thrust and the anti-thrust directions, performing build-up welding in the first and the second build-up welding portions, and final finishing the cylinder block to the first finished bore dimension, whereby a surface of the bore retains an abrasion resistant layer having the abrasion resistance layer thickness and the desired welding strain along the thrust and anti-thrust directions.

According to another embodiment of the present invention, there is provided a method for manufacturing a cylinder block of an internal combustion engine, wherein: the first build-up welding portion is a first region aligned symmetrically to the thrust direction, and the second build-up welding portion is a second region aligned symmetrical to the anti-thrust direction, thereby providing abrasion resistance in a limited area capable of effectively meeting the set of parameters without damaging the internal combustion engine with excessive welding strain.

According to another embodiment of the present invention, there is provided a method for manufacturing a cylinder block of an internal combustion engine, wherein: the first region covers from at least about ±5° to about ±85° on either side of the thrust direction relative to a center axis of the bore, and the second region covers from at least about ±5° to about ±85° on either side of the anti-thrust direction relative to the center axis of the bore.

According to another embodiment of the present invention, there is provided a method for manufacturing a cylinder block of an internal combustion engine, wherein: the first region preferably covers from at least about ±5° to about ±45° on either side of thrust direction relative to the center axis of the bore, and the second region preferably covers from at least about ±5° to about ±45° on either side of the anti-thrust direction relative to the center axis.

According to another embodiment of the present invention, there is provided a method for manufacturing a cylinder block of an internal combustion engine, wherein: the step of defining a set of parameters includes a step of selecting a difference between the first finished bore dimension and at least a first recessed bore dimension, sufficient to allow the abrasion resistant layer to be from at least about 2 mm to about 5 mm in thickness, whereby the abrasion resistant layer is effective to resist abrasion during use and minimize distortion of the cylinder block due to the welding strain.

According to another embodiment of the present invention, there is provided a method for manufacturing a cylinder block of an internal combustion engine, wherein: the difference is preferably between from about 3 mm to about 4 mm.

According to another embodiment of the present invention, there is provided a method for manufacturing a cylinder block of an internal combustion engine, comprising the steps of: providing a preformed cylinder block having at least one preformed build-up welding portion along a cylinder bore matching at least a thrust direction, performing build-up welding in the at least one preformed build-up welding portion, and finishing the cylinder bore to a final form, whereby the surface of the cylinder bore is abrasion resistant in at least the thrust direction during operation of the internal combustion engine.

According to another embodiment of the present invention, there is provided a method for manufacturing a cylinder block of an internal combustion engine, wherein: the step of providing a preformed cylinder block includes a second step of providing the preformed cylinder block with at least a second preformed welding portion along the cylinder bore matching at least an anti-thrust direction, and the step of providing build-up welding includes a second step of providing the build-up welding in the second preformed welding portion.

According to another embodiment of the present invention, there is provided a method for manufacturing a cylinder block of an internal combustion engine, comprising the steps of: determining a set of parameters for the cylinder block, the set of parameters including at least a desired abrasion resistance layer thickness, a desired welding strain, a desired first finished bore diameter, a thrust direction, and an anti-thrust direction, forming a cylinder block matching the set of parameters and having at least a first recessed bore diameter greater than the first finished bore dimension, designating at least a first and a second build-up welding portion along a bore of the cylinder block corresponding to the thrust and the anti-thrust directions, performing build-up welding in the first and the second build-up welding portions, and finishing the bore into the first finished bore dimension, whereby a surface of the bore retains the desired abrasion resistance layer thickness along the thrust and the anti-thrust directions and the cylinder block has a first welding strain less than the desired welding strain.

According to another embodiment of the present invention, there is provided a method for manufacturing a cylinder block of an internal combustion engine, wherein: the desired abrasion resistance layer thickness is from at least about 2 mm to about 5 mm.

According to another embodiment of the present invention, there is provided a method for manufacturing a cylinder block of an internal combustion engine, wherein: the desired abrasion resistance layer thickness is preferably from at least about 3 mm to about 4 mm.

According to another embodiment of the present invention, there is provided a method for manufacturing a cylinder block of an internal combustion engine, wherein: the first build-up welding portion covers from at least about ±5° to about ±85° on either side of the thrust direction relative to a center axis of the bore, and the second build-up welding portion covers from at least about ±5° to about ±85° on either side of the anti-thrust direction relative to the center axis of the bore.

According to another embodiment of the present invention, there is provided a method for manufacturing a cylinder block of an internal combustion engine, wherein: the first build-up welding portion covers from at least about ±5° to about ±45° on either side of thrust direction relative to the center axis of the bore, and the second build-up welding portion from at least about ±5° to about ±45° on either side of the anti-thrust direction relative to a center axis.

According to another embodiment of the present invention, there is provided a method for manufacturing a cylinder block of an internal combustion engine, comprising the steps of: conducting build-up welding on an inner surface of a bore of the cylinder block only in a region where a detrimental abundance of piston abrasion occurs, and finishing the inner surface of the bore to a final dimension, whereby the inner surface is resistant to piston abrasion and a build-up welding portion has a desired final thickness.

According to another embodiment of the present invention, there is provided a method for manufacturing a cylinder block of an internal combustion engine, wherein: the region includes at least a first region from at least about ±5° to about ±85° in a thrust direction and a second region from at least about ±5° to about ±85° in an anti-thrust direction relative to the bore of the cylinder block.

According to another embodiment of the present invention, there is provided a method for manufacturing a cylinder block of an internal combustion engine, wherein: the inner surface is preformed into at least a first recessed shape along the thrust direction and at least a second recessed shape along the anti-thrust direction.

According to another embodiment of the present invention, there is provided a method for manufacturing a cylinder block of an internal combustion engine, wherein: the desired final thickness is from at least about 3 mm to about 4 mm in thickness.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
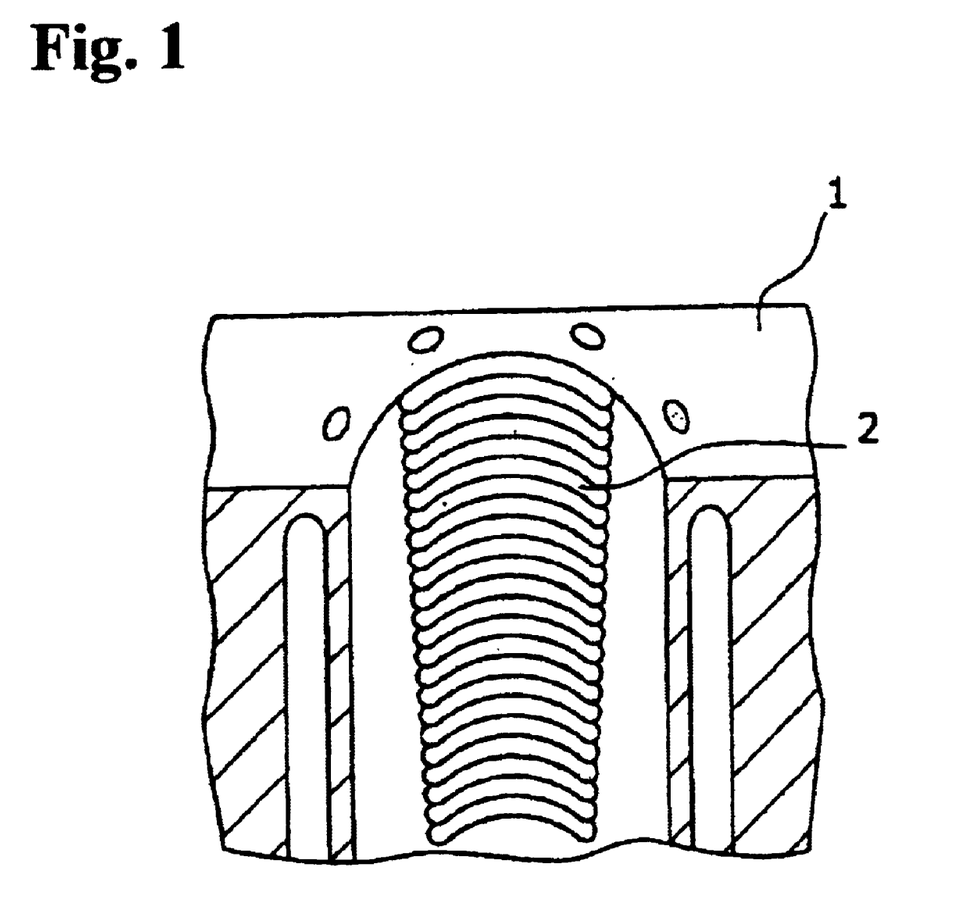
FIG. 1 is a partial cross-sectional perspective view of a cylinder block manufactured according to the present invention.

Referring now to FIG. 1, during manufacture a plurality of build-up welding beads 2 (hereinafter referred to as beads 2) are formed on an inner surface of a cylinder bore in a cylinder block 1. Beads 2 are formed on preselected regions where a large amount of piston abrasion along the cylinder bore of cylinder block 1 is likely to occur. After finishing, beads 2 form an abrasion-resistant layer on the inner surface of the cylinder bore, as will be described.

Beads 2 are formed within areas (shown later) designated as receiving unacceptable amounts of piston abrasion during use. These designated areas receive the most abrasion when a piston (also shown later) moves upward and downward during operation of cylinder block 1.

The designated areas include a first area and a second area, as will be explained. The first area ranges from at least about ±5° to about ±85° along a cylinder wall in a thrust direction, as will be explained. The second area ranges from at least about ±5° to about ±85° along a cylinder wall in an anti-thrust direction, as will be described.

Figure 2:
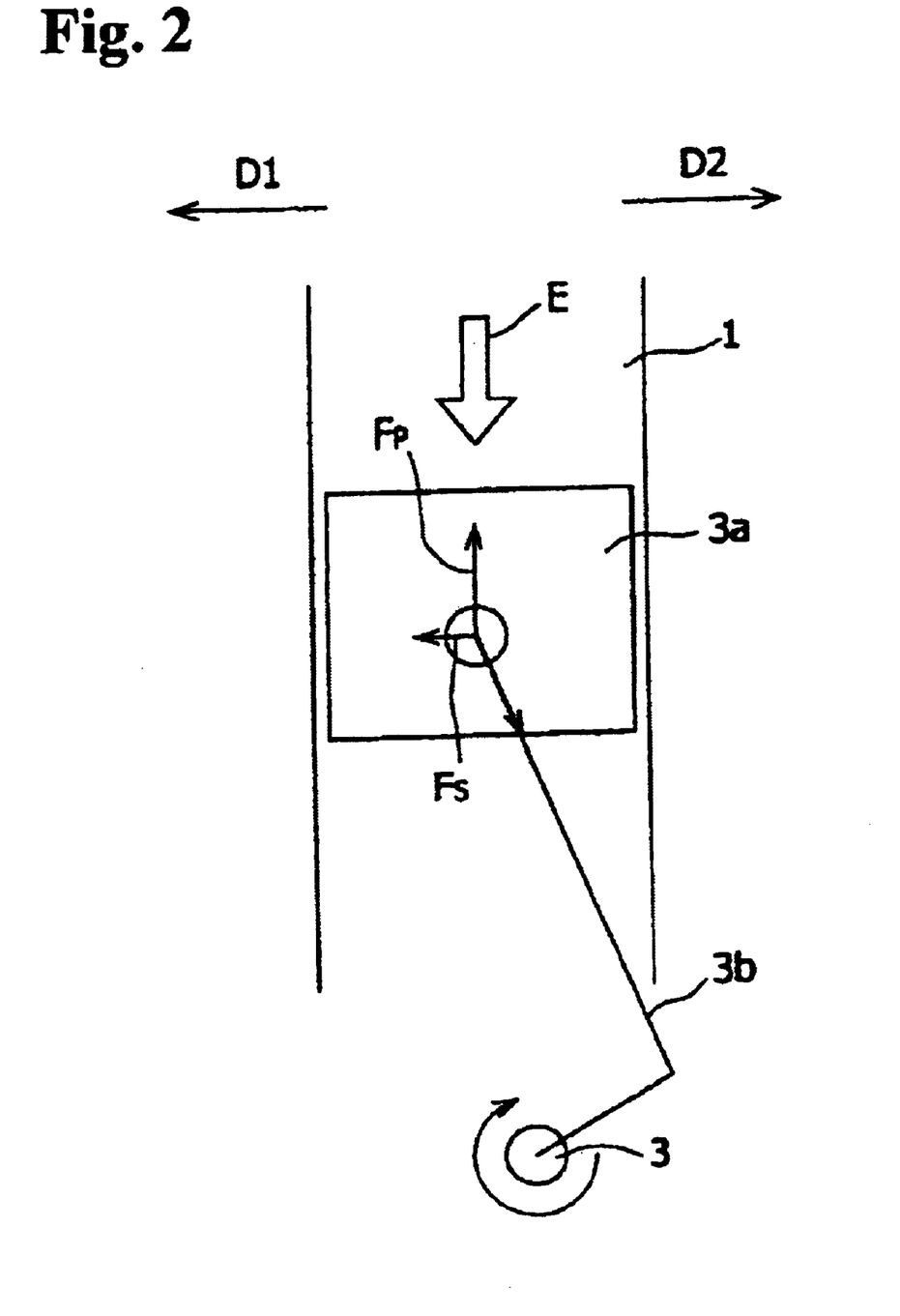
FIG. 2 is a conceptional view of forces in a cylinder block during use is an internal combustion engine.
Figure 3:
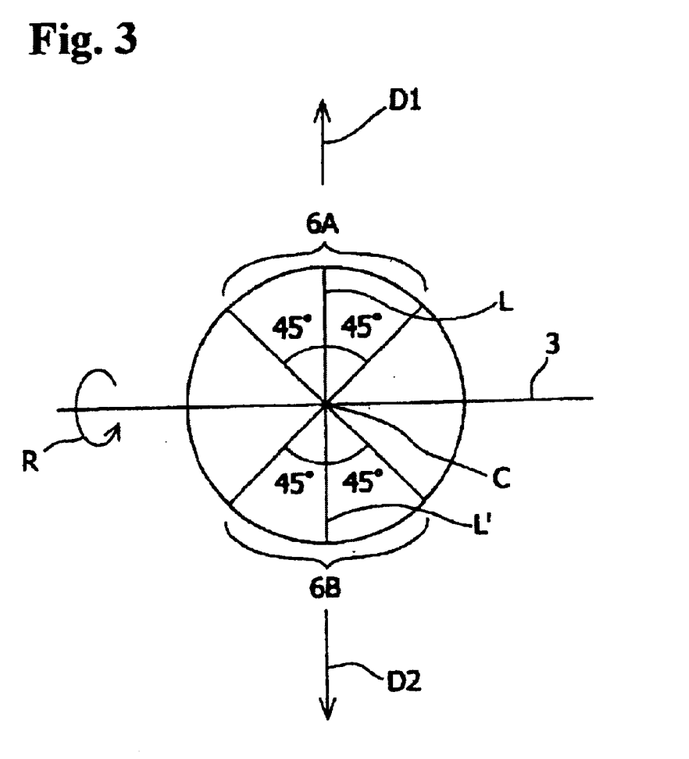
FIG. 3 is a conceptional view showing an area of build-up welding in a cylinder bore according to an embodiment of the method of the present invention.

Referring now to FIGS. 2 and 3, during operation, a piston 3a moves upward and downward in cylinder block 1. A linking mechanism includes a connecting rod 3b connecting a piston 3a to a crank shaft 3. During operation, connecting rod 3b operates along a path at right angles to a central axis of crank shaft 3.

During cylinder block 1 ignition operations, an explosive pressure E forces or thrusts piston 3a downward toward crank shaft 3. Connecting rod 3b receives the explosive pressure E from piston 3a to drives crank shaft 3 in a cycle. A reactive force $F_p$ pushes upward on piston 3a from connecting rod 3b in reaction to the engine and other forces. A pressing force $F_s$ pushes outward against cylinder block 1 in reaction to cylinder block 1 pressing inward on piston 3a.

A first pressing or thrust direction is defined as a thrust direction D1. When moving downward, piston 3a receives both axial pressing force $F_s$ and a side force along thrust direction D1, due to the angle of the connecting rod 3b.

A second pressing direction is defined as an anti-thrust direction D2. When moving upward, away from crankshaft 3, piston 3a receives a force along anti-thrust direction D2, opposite to force $F_s$, due to the reaction force from compressing gasses in cylinder block 1 and the opposite angle of the connecting rod 3b.

During operation, pressing force D1 is in directed opposite to pressing force D2, as will be explained.

Referring now also to FIG. 3, a center point C is defined as an axis line passing through the center bore of cylinder block 1. During operation, a crank rotates about crankshaft 3 in a direction R. Crank shaft 3 is directly below center point C and connection rod 3b operates along a vector at right angles to crank shaft 3.

During operation, while piston 3a is descending toward crank shaft 3, a side 6A of cylinder block 1 is defined as that area subjected to a frictional force. Side 6A is centered along thrust direction D1. A plane L is defined as a plane crossing crank shaft 3 at right angles and containing a central axis of movement for connecting rod 3b.

With L as a boundary plane, the first area(not shown) is defined ranging on either side of thrust direction D1 and plane L from at least about ±5° to about ±85° degrees relative to center point C. The first area is an area that selectively receives beads 2 during processing to resist abrasion. The first area shown in the FIG. 3 embodiment, defined along side 6A, employs ranges are illustrated from at least about ±45°, relative to either side of center point C and thrust direction D1.

During operation, when piston 3a is ascending, driven upward away from crank shaft 3, a side 6B of cylinder block 1 is subjected to frictional force. Side 6B is centered along anti-thrust direction D2. A plane L' is defined as a plane crossing crank shaft 3 at right angles and containing a central axis of connecting rod 3b.

With L' as a boundary plane, a second area(not shown) is defined ranging on either side of anti-thrust direction D2 and plane L' from at least about ±5° to about ±85° degrees relative to center point C. The second area is an area that also selectively receives beads 2 during processing to resist abrasion. The second area shown in the FIG. 3 embodiment ranges from at least about ±45° relative to either side of center point C and thrust direction D2.

In the present embodiment, the first area of thrust direction D1 (and side 6A) and the second area of anti-thrust direction D2 (and side 6B)are symmetrical. Thrust direction D1 and anti-thrust direction D2 are perpendicular to crank shaft 3 and lie generally along the line of motion of connecting rod 3b. Further, depending upon engine dynamics, thrust direction D1 and anti-thrust direction D2 (and the corresponding first and second areas) may vary slightly from symmetry.

The requirements impacting the needed abrasion resistance areas, and the amount of abrasion resistance required include temperature, thermal transfer rates, rate of wear, the existence and type of lubrication used in cylinder block 1, and many other factors.

As a result, in alternative embodiments, since the abrasion resistance necessary to protect cylinder block 1 depends upon such a variety of requirements, the range of beads 2 in thrust direction D1 is adaptable and may be different from the range of beads 2 in anti-thrust direction D2. Thus, symmetry of sides 6A, 6B is not required.

What is important in providing an abrasion-resistant layer, by means of build-up welding, is that the built-up layers, have a thickness from about 2 to 5 mm, and preferably from about 3 to 4 mm, after final finishing, are located in the areas most prone to abrasion and wear. To accommodate such thickness, it is beneficial to preform the inner surface of the cylinder bore before welding begins.

Figure 4A:
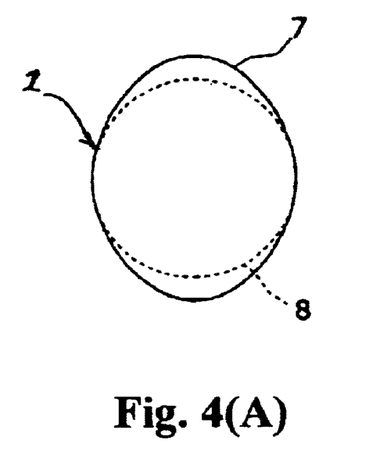
FIG. 4(A) is a conceptional plan view of a preformed cylinder bore prior to receiving build-up welding according to the present invention.

Referring now to FIG. 4(A), a line 7 represents an approximate cylinder bore inner surface of cylinder block 1, prior to build-up welding. A dotted line 8 represents the predicted finished surface of the cylinder bore, after final processing.

It is important to understand that in preparation for build-up bead welding, the cylinder bore inner surface is shaped as a semi-ellipse or similar shape when viewed along the bore axis. The difference between line 7 and dotted line 8 approximately represents the finished space to be filled with beads 2, as will be described.

Figure 4B:
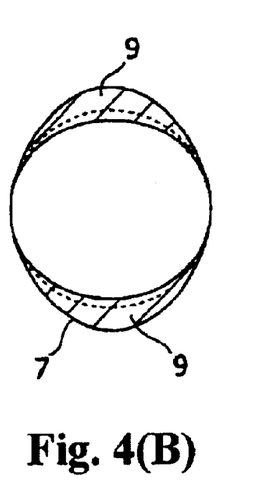
FIG. 4(B) is a conceptional plan view of a cylinder bore after receiving an embodiment of build-up welding according to the present invention.
Figure 4C:
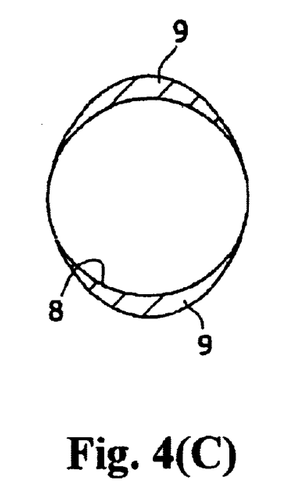
FIG. 4(C) is a conceptional plan view of a cylinder bore after receiving build-up welding and finishing.

Referring now to FIGS. 4(B), and 4(C), during build-up welding processing, the plurality of build-up welding beads 2 are placed along line 7 and, in final form, slightly exceed the position of dotted line 8. A built-up welded portion 9 represents the initial result of the plurality of built-up welding beads 2. Since the exterior surface (not shown) of built-up welded portion 9 is rough and is often undercut, beads 2 are built up beyond the position of dotted line 8. Later processing finishes the circumference of the inner cylinder bore surface completely, removes any undercut, thereby leaving a smooth surface.

Figure 5:
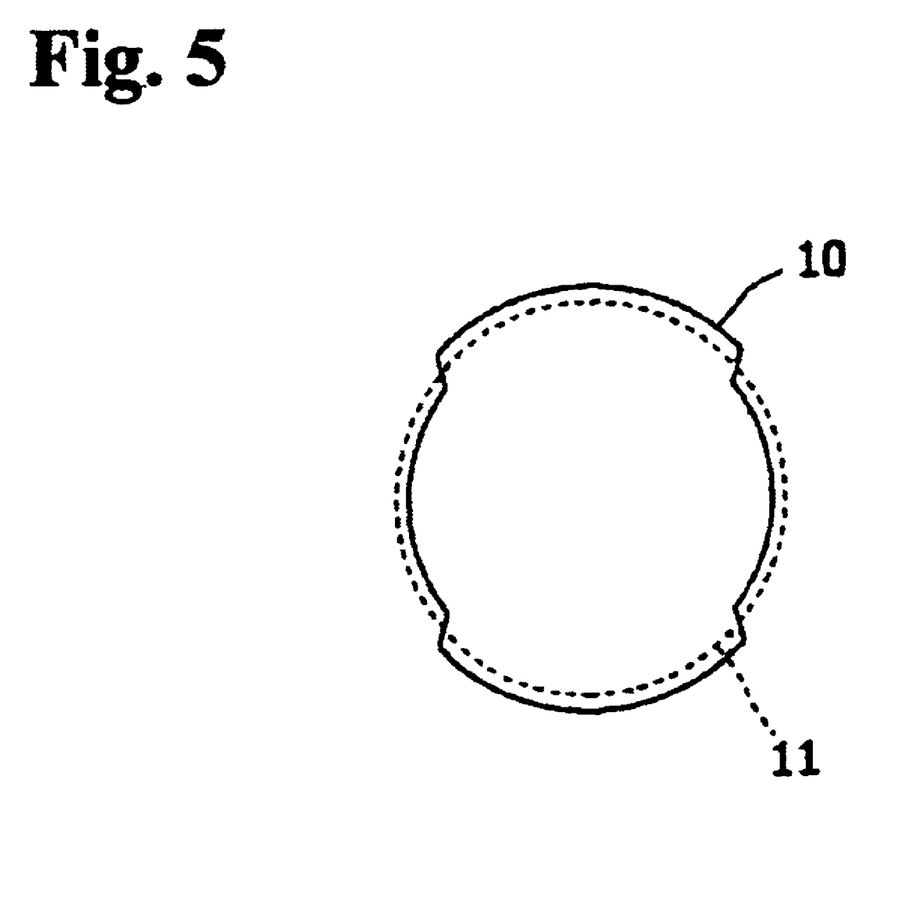
FIG. 5 is a conceptional plan view showing the relationship between a preformed build-up welding portion and a finished surface, according to another another embodiment of the present invention.

Referring now to FIG. 5, as an alternative to the above embodiment, a built-up welding portion 10 may be preformed in cylinder block 1 and filled with beads 2. Later processing and finishing produces a completely rounded finished surface 11.

Depending upon abrasion resistance and distortion-minimizing desired, preformed built-up welded portion 10 and inner surface 7 may assume a variety of shapes adapted to specific requirements and production needs.

A surface melting alloy method is the preferable method for forming build-up weld bead 2 in the present invention.

Examples of acceptable surface melting alloy methods include a plasma powder build-up welding process, a TIG arc alloy build-up welding process, a $CO_2$ arc welding process, a laser welding process, and an electron beam welding process.

Other techniques for forming an abrasion-resistant layer on the inner surface of the cylinder include thermal spraying and plating. Unfortunately, where a thermal spraying or plating boundary surface exists on a sliding surface, membrane peeling occurs. Undesirable membrane peeling occurs since both thermal spraying and plating provide a nondurable joint between the abrasion-resistant layer and the base material. Thus, in the present invention, the abrasion-resistant layer is preferably formed neither by thermal spraying nor plating, but by build-up welding using a surface melting alloy method.

In the surface melting alloy method, the abrasion resistant layer formed by build-up welding joins rigidly to the base material to effectively prevent peeling even where the boundary layer exists on the sliding surface.

In the plasma powder build-up welding process, the surface of a base metal is melted by means of plasma arc to provide a molten pool. A powder (material for cover layer) and a carrier gas are then added to the molten pool to form a cover layer.

In the TIG arc alloy build-up welding process, an alloyed layer is be obtained by adding a powder, fed onto a base material through a powder feeding nozzle, to a molten pool produced by melting the surface of a base material with a TIG arc torch.

Any of the processes using a $CO_2$ arc, laser beam and electron beam is usable according to a common principle for processing with the only major difference being the fusing heat source.

The results of examples of the method for manufacturing according to the present invention are described.

EXAMPLES 1 THROUGH 3

An abrasion-resistant layer was formed on the inner surface of the bore of a single-cylinder type cylinder block with an inner diameter of 100 mm utilizing plasma powder build-up welding equipment under the conditions shown in Table 1.

Three types of welding operations were performed at different coating angles in a range between about ±5° to ±85° from thrust direction D1 and anti-thrust direction D2 by changing cylinder rotation angles. An alloy powder containing aluminum, 23% of Si, 3% of Co, 3% of Fe, 3% of Ni, 3% of Cu, and 1% of Mg (wt %) was used as a filler metal.

TABLE 1

| | Welding Conditions | | | | | | |
|---|---|---|---|---|---|---|---|
| | Welding current (A) | Plasma gas amount (L/min) | Shield gas amount (L/min) | Rotation speed (mm/min) | Rotation angle (°) | Weaving speed (mm/min) | Weaving width (mm) |
| Example 1 | 180-150 | 2 | 12 | 363 | 10° × 2 | 2040 | 16 |
| Example 2 | 180-150 | 2 | 12 | 363 | 90° × 2 | 2040 | 16 |
| Example 3 | 180-150 | 2 | 12 | 363 | 170° × 2 | 2040 | 16 |

After final finishing, the cylinder block was assembled to form an operable engine. A bench endurance trial was conducted with 25 sets of 7000 RPM for 25 minutes (total 4, 375, 000 revolutions).

An increase in the inner diameter of a cylinder after the bench endurance test is shown in Table 2.

TABLE 2

| | Test Results (angle °) | |
|---|---|---|
| | Covering range (°) | Increase in the inner diameter after endurance test ($\mu$m) |
| Example 1 | ±5° from thrust direction ±5° from anti-thrust direction | 30 |
| Example 2 | ±4550° from thrust direction ±45° from anti-thrust direction | 12 |
| Example 3 | ±85° from thrust direction ±85° from anti-thrust direction | 10 |

In Examples 1–3, preheating of the work area (at 150° C.) was followed by build-up welding to prevent cracking and minimize blow holes caused by hydrogen. The welding current was in the range of 180 to 150 A. During the Examples 1–3, the current level was lowered as needed considering the fact that more heat is stored in the work as welding operations proceed.

As seen from Table 2, the inner diameter increased greatly in the range of ±5°, as viewed from the thrust and the anti-thrust direction. This increase in diameter was not significant enough to cause stoving. Therefore, is be understood that build-up welding, at least in this range, will make the resulting abrasion-resistant layer effective to avoid failure.

Additionally, in a range of about ±85°, when viewed in the thrust and anti thrust directions, an approximate upper effective limit exists. This upper limit is based on consideration of the effects of the abrasion-resistant layer only. Should unusual abrasion-resistant needs arise, the range may be increased as needed.

According to the above the Examples 1–3, the abrasion resistant coating should cover an area ranging from at least about ±5° to about ±85° to obtain an inner surface with both sufficient abrasion resistance and a degree of welding strain which allows easy post processing of the material. Since the area receiving build-up welding is restricted to the areas described above, welding strain is effectively managed and strain distortion is minimized.

OTHER EXAMPLES

While it was noted during Examples 1–3 that an alloy powder containing aluminum, 23% of Si, 3% of Co, 3% of Fe, 3% of Ni, 3% of Cu, and 1% of Mg (wt %) was used, the present invention is not limited to the use of such an alloy powder, but is adaptable to various alloys according to manufacturer need.

The method of the present invention may be applied with coating layer(s) alloys described in related Japanese Unexamined Patent Publications No. 10-030163 and 10-096087 from the same inventor(s).

In Japanese Unexamined Patent Publication No. 10-030136, a suitable alloy powder consists of an aluminum alloy powder containing 5 to 20 atom % of silver, 5 to 20 atom % of copper, 5 to 20 atom % of silicon and the rest aluminum. Also disclosed is a similar but preferable alloy powder consisting of 10 to 15 atom % of silver, 10 to 15 atom % of copper, 10 to 15 atom % of silicon and the rest aluminum.

In Japanese Unexamined Patent Publication No. 10-96087, a suitable coating layer is disclosed which may contain aluminum as a main ingredient, 1 to 40 atom % of copper, and other alloy ingredients adopted to the present invention.

In each context above, the subject material for welding is an aluminum cylinder block.

The reader should also recognize that the present method invention may be adaptable for welding on a cast iron cylinder block, as disclosed in Japanese Unexamined Patent Publication No. 9-314342.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a cylinder block of an internal combustion engine, comprising the steps of:
   defining a set of parameters for said cylinder block including at least an abrasion resistance layer thickness, a desired welding strain, a first finished bore dimension, a thrust direction, and an anti-thrust direction;
   forming a cylinder block matching said set of parameters;
   designating at least a first and a second build-up welding portion along a bore of said cylinder block corresponding to said thrust and said anti-thrust directions;
   performing build-up welding in said first and said second build-up welding portions; and
   final finishing said cylinder block to said first finished bore dimension, whereby a surface of said bore retains an abrasion resistant layer having said abrasion resistance layer thickness and said desired welding strain along said thrust and anti-thrust directions.

2. A method, according to claim 1, wherein:
   said first build-up welding portion is a first region aligned symmetrically to said thrust direction; and
   said second build-up welding portion is a second region aligned symmetrical to said anti-thrust direction, thereby providing abrasion resistance in a limited area capable of effectively meeting said set of parameters without damaging said internal combustion engine with excessive welding strain.

3. A method, according to claim 2, wherein:
   said first region covers from at least about ±5° to about ±85° on either side of said thrust direction relative to a center of axis of said bore; and
   said second region covers from at least about ±5° to about ±85° on either side of said anti-thrust direction relative to said center axis of said bore.

4. A method, according to claim 3, wherein:
   said first region preferably covers from at least about ±5° to about ±45° on either side of thrust direction relative to said center axis of said bore; and
   said second region preferably covers from at least about ±5° to about ±45° on either side of said anti-thrust direction relative to said center axis.

5. A method, according to claim 2, wherein:
   said step of defining a set of parameters includes a step of selecting a difference between said first finished bore dimension and at least a first recessed bore dimension, sufficient to allow said abrasion resistant layer to be from at least about 2 mm to about 5 mm in thickness, whereby said abrasion resistant layer is effective to resist abrasion during use and minimize distortion of said cylinder block due to said welding strain.

6. A method, according to claim 5, wherein:
   said difference is between from about 3 mm to about 4 mm.

7. A method for manufacturing a cylinder block of an internal combustion engine, comprising the steps of:
   providing a preformed cylinder block having a least one preformed build-up welding portion along a cylinder bore matching at least a thrust direction;
   performing build-up welding in said at least one preformed build-up welding portion; and
   finishing said cylinder bore to a final form, whereby said surface of said cylinder bore is abrasion resistant in at least said thrust direction during operation of said internal combustion engine.

8. A method, according to claim 7, wherein:
   said step of providing a preformed cylinder block includes a second step of providing said preformed cylinder block with at least a second preformed welding portion along said cylinder bore matching at least an anti-thrust direction; and
   said step of providing build-up welding includes a second step of providing said build-up welding in said second preformed welding portion.

9. A method of manufacturing a cylinder block of an internal combustion engine, comprising the steps of:
   determining a set of parameters for said cylinder block, said set of parameters including at least a desired abrasion resistance layer thickness, a desired welding strain, a desired first finished bore diameter, a thrust direction, and an anti-thrust direction;
   forming a cylinder block matching said set of parameters and having at least a first recessed bore diameter greater than said first finished bore dimension;

designating at least a first and a second build-up welding portion along a bore of said cylinder block corresponding to said thrust and said anti-thrust directions;

performing build-up welding in said first and said second build-up welding portions; and finishing said bore into said first finished bore dimension, whereby a surface of said bore retains said desired abrasion resistance layer thickness along said thrust and said anti-thrust directions and said cylinder block has a first welding strain less than said desired welding strain.

10. A method, according to claim 9, wherein:

said desired abrasion resistance layer thickness is from at least about 2 mm to about 5 mm.

11. A method, according to claim 10, wherein:

said desired abrasion resistance layer thickness is from at least about 3 mm to about 4 mm.

12. A method, according to claim 9, wherein:

said first build-up welding portion covers from at least about ±5° to about ±85° on either side of said thrust direction relative to a center axis of said bore; and said second build-up welding portion covers from at least about ±5° to about ±85° on either side of said anti-thrust direction relative to said center axis of said bore.

13. A method, according to claim 12, wherein:

said first build-up welding portion covers from at least about ±5° to about ±45° on either side of thrust direction relative to said center axis of said bore; and said second build-up welding portion from at least about ±5° to about ±45° on either side of said anti-thrust direction relative to a center axis.

14. A method for manufacturing a cylinder block for an internal combustion engine, comprising the steps of:

conducting build-up welding on an inner surface of a bore of said cylinder block only in a region where a detrimental abundance of piston abrasion occurs; and finishing said inner surface of said bore to a final dimension, whereby said inner surface is resistance to piston abrasion and a build-up welding portion has a desired final thickness.

15. A method, according to claim 14, wherein:

said region includes at least a first region from at least about ±5° to about ±85° in a thrust direction and a second region from at least about ±5° to about ±85° in an anti-thrust direction relative to said bore of said cylinder block.

16. A method, according to claim 15, wherein:

said inner surface is preformed into at least a first recessed shape along said thrust direction and at least a second recessed shape along said anti-thrust direction.

17. A method, according to claim 16, wherein:

said desired final thickness is from at least about 3 mm to about 4 mm in thickness.

* * * * *